(12) United States Patent
Sulaiman et al.

(10) Patent No.: US 11,059,394 B2
(45) Date of Patent: Jul. 13, 2021

(54) VEHICLE SEAT STRUCTURAL COMPONENT, VEHICLE SEAT AND METHOD FOR MANUFACTURING A VEHICLE SEAT STRUCTURAL COMPONENT

(71) Applicant: Faurecia Autositze GmbH, Stadthagen (DE)

(72) Inventors: Hosen Sulaiman, Dortmund (DE); Jörg Völlmecke, Porta Westfalica (DE); Markus Schenke, Petershagen (DE); Michael Schaper, Petershagen (DE); Jens Witt, Nienstaedt (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 16/920,501

(22) Filed: Jul. 3, 2020

(65) Prior Publication Data
US 2021/0001755 A1    Jan. 7, 2021

(30) Foreign Application Priority Data

Jul. 5, 2019    (DE) ...................... 10 2019 118 255.7

(51) Int. Cl.
*F16M 13/00*     (2006.01)
*B60N 2/04*      (2006.01)
*B60N 2/16*      (2006.01)
*B60N 2/68*      (2006.01)

(52) U.S. Cl.
CPC .......... *B60N 2/1615* (2013.01); *B60N 2/682* (2013.01)

(58) Field of Classification Search
CPC .......... B60N 2/682; B60N 2/1615; B60N 2/68
See application file for complete search history.

(56) References Cited

U.S. PATENT DOCUMENTS

| | | | |
|---|---|---|---|
| 3,279,051 A | 10/1966 | Minshall | |
| 4,597,687 A | 7/1986 | Colas | |
| 5,104,190 A * | 4/1992 | Siegrist | B60N 2/22 297/354.1 |
| 5,280,138 A * | 1/1994 | Preston | B65H 57/10 16/2.1 |
| 6,227,595 B1 * | 5/2001 | Hamelin | B60N 2/01583 296/65.01 |
| 8,322,675 B2 | 12/2012 | Ducreuzot | |
| 8,857,913 B2 | 10/2014 | Schuhmacher | |
| 9,573,501 B2 * | 2/2017 | Shiromura | B60N 2/682 |
| 9,701,227 B2 | 7/2017 | Ferenc | |
| 10,106,065 B2 * | 10/2018 | Matsui | B60N 2/68 |

(Continued)

FOREIGN PATENT DOCUMENTS

| | | |
|---|---|---|
| DE | 3320164 A1 | 12/1983 |
| DE | 102010008676 A1 | 10/2010 |

(Continued)

*Primary Examiner* — Shin H Kim
(74) *Attorney, Agent, or Firm* — Barnes & Thornburg LLP

(57) ABSTRACT

A vehicle seat structural component comprises a transverse tube and a structural element, in particular a vehicle seat side frame element the transverse tube is connected to the structural element in a connecting region. The structural element comprises a conical sleeve the structural is arranged captively in axial direction between deformed sections. One section is a curling wherein the conical sleeve is also arranged captively in radial direction.

8 Claims, 6 Drawing Sheets

(56) References Cited

U.S. PATENT DOCUMENTS

| | | | |
|---|---|---|---|
| 10,279,707 B2 * | 5/2019 | Matsui | B60N 2/682 |
| 10,406,944 B2 * | 9/2019 | Ishihara | B60N 2/0232 |
| 2006/0244298 A1 * | 11/2006 | Runde | B60N 2/80 297/391 |
| 2011/0133538 A1 * | 6/2011 | Adragna | B60N 2/682 297/452.18 |
| 2012/0305359 A1 * | 12/2012 | Sato | B60N 2/168 192/45.001 |
| 2018/0222356 A1 * | 8/2018 | Ishihara | B60N 2/0232 |
| 2018/0297492 A1 | 10/2018 | Sulaiman | |
| 2019/0152347 A1 * | 5/2019 | Becker | F16H 57/032 |
| 2020/0298738 A1 * | 9/2020 | Tachikawa | B60N 2/1615 |
| 2021/0001755 A1 * | 1/2021 | Sulaiman | B60N 2/1615 |

FOREIGN PATENT DOCUMENTS

| | | |
|---|---|---|
| DE | 112008004005 T5 | 1/2012 |
| DE | 102013112462 A1 | 5/2015 |
| DE | 102015206461 A1 | 10/2016 |
| DE | 102015219497 A1 | 4/2017 |
| DE | 11201600461915 | 7/2018 |
| DE | 102017108206 A1 | 10/2018 |
| EP | 2027951 A1 | 2/2009 |
| GB | 2047833 A | 12/1980 |
| WO | 2017060205 A1 | 4/2017 |

* cited by examiner

VEHICLE SEAT STRUCTURAL COMPONENT, VEHICLE SEAT AND METHOD FOR MANUFACTURING A VEHICLE SEAT STRUCTURAL COMPONENT

PRIORITY CLAIM

This application claims priority to German Patent Application No. DE 10 2019 118 255.7, filed Jul. 5, 2019, which is expressly incorporated by reference herein.

BACKGROUND

The present disclosure relates to a vehicle seat structural component, particularly being used in a vehicle seat.

SUMMARY

According to the present disclosure, a vehicle seat structural component may be used in a vehicle seat. The vehicle seat structural component comprises a structural element. The structural element comprises a conical sleeve. The conical sleeve has an inner surface with a shape of a truncated cone, a front surface and an outer surface (which might also have the shape of a truncated cone). The structural element comprises an opening. This opening is limited by the inner surface of the conical sleeve.

In illustrative embodiments, the vehicle seat structural component comprises a transverse tube. The transverse tube has a first deformed section which has been deformed or widened in outer direction and a second deformed section which has also been deformed or widened in outer direction. A connecting section connects the first deformed section and the second deformed section. The connecting section comprises an outer connecting section surface. The outer connection section surface is inclined corresponding to the inclination of the inner surface of the conical sleeve. The outer connecting section surface contacts the inner surface of the conical sleeve (not with a point or line contact but with a large contact area or with the whole outer surface). According to the present disclosure, the first deformed section comprises a curling. In a semi longitudinal section the curling has a circumferential angle in the range of about 220° to about 310°, in particular about 240° to about 290°.

In illustrative embodiments, the vehicle seat structural component, the connecting section of the transverse tube extends through the opening of the structural element and so through the conical sleeve. In this mounted position the first deformed section is arranged on a first axial side of the conical sleeve whereas the second deformed section is arranged on a second axial side of the conical sleeve. Accordingly, the structural element is secured in a first axial direction by the first deformed section and secured in a second axial direction by the second deformed section. It is possible that the structural element is clamped or captively arranged between the first deformed section and the second deformed section.

In the mounted state of the vehicle seat structural component the first deformed section extends with a first subsection radially within the inner surface of the conical sleeve, extends with another subsection in front of the front surface of the conical sleeve (in direct contact with the front surface of the conical sleeve or with a distance from the front surface of the conical sleeve) and extends with a second subsection radially outside from the outer surface of the conical sleeve. Accordingly, the conical sleeve is captively arranged in radial direction or radially sandwiched between the first subsection and the second subsection of the first deformed section.

In illustrative embodiments, the vehicle seat structural component is improved in many ways compared to comparative mechanisms. It is possible, for example, that
the optical appearance is improved and/or
the mechanical stability is increased which is, for example, helpful in the case of dynamic stresses or in the case of a crash and/or
forces, torques and/or moments are supported in a stiff way and/or
the provision of a connection with increased supporting surfaces is provided and/or
a smaller wall thickness of the transverse tube can be used and/or
the vehicle seat structure is improved for great diameters of the transverse tube.

In illustrative embodiments, the structural element might be a vehicle seat side frame art, a link, a flange, a crank, an operation element or operation lever.

Some embodiments of the present disclosure may be based on the finding that the connections between the deformed section of the transverse tube and the structural element from comparative devices solely base on
an axial clamping between two deformations,
friction of the widened transverse tube in the opening,
a form lock of a radial widening of the transverse tube with openings of the structural element or
an axial pressing of a deformation of the transverse tube into openings of the structural element.

The above explained measures might be used within the frame of the present disclosure without the aforementioned measures from comparative devices or cumulatively with these measures.

In illustrative embodiments, it is possible that the conical sleeve is formed by an axial protrusion of the structural element. This means that the structural element does not have a planar shape (at least in the connecting region with the transverse tube) and the structural element does not exclusively extend in a plane having an orientation transverse to the longitudinal axis of the transverse tube. Instead, the conical sleeve protrudes from a base body of the structural element.

In illustrative embodiments, it is possible that the transverse tube, here the connecting section, extends radial inside from the inner surface of the conical sleeve. Accordingly, an axial overlap between the structural element and the transverse tube is not limited to the wall thickness of the (base body of the) structural element. Instead, the present disclosure increases the axial overlap in the connecting region by an extend defined by the longitudinal extension of the conical sleeve. In this way it is possible to provide an increased contact area and supporting surface.

In illustrative embodiments, the present disclosure suggests that the curling of the first deformed section has a shape such that the curling extends along the front face of the conical sleeve and to the outside of the conical sleeve. As a consequence, the conical sleeve is radially sandwiched or arranged captively in radial direction between the first subsection and the second subsection, so an inner section and an outer section of the curling. The inventive embodiment might lead to an increase of the contact area and the supporting area between the transverse tube and the structural element. It is e.g. possible that an additional support is provided by a contact of the front face of the conical sleeve with the curling of the first deformed section. Due to the fact that the curling of the transverse tube also extends outside from the conical sleeve, it is also possible that the transverse tube is additionally supported by the outside of the conical sleeve. Within the frame of the present disclosure, the first subsection and the second subsection have an axial overlap where the conical sleeve is sandwiched between the subsections, the subsections contacting the conical sleeve or being arranged with a radial play relative to the conical sleeve.

In illustrative embodiments, the conical sleeve might have a ring-shaped cross section being closed in circumferential direction. It is also possible that the conical sleeve comprises a plurality of axial slots, the axial slots extending from the free end region of the sleeve over a part of the longitudinal extension of the conical sleeve or extending up to the base body of the structural element or even into the base body of the structural element.

In illustrative embodiments, it is possible that only a part of the aforementioned contact surfaces and supporting surfaces are effective for providing the connection or all of the contact surfaces or supporting surfaces are effective for providing the connection. Here, the contact surfaces and/or supporting surfaces might be permanently effective or might only become effective in the case of a bias of the connection with a load above a threshold and/or for a given elastic and/or plastic deformation of the structural element and/or the transverse tube in the connecting region.

In illustrative embodiments, the conical sleeve might be connected to the base body of the structural element in a lot of different ways. It is e.g. possible that the conical sleeve is provided separately from the base body and then connected to the base body of the structural element by a material bond, e.g. by welding. For one proposal of the present disclosure, the conical sleeve is a deformed section of a base body of the structural element. The deformation is in particular a plastic deformation induced by a pressing method or a forging method used for producing the structural element.

In illustrative embodiments, it is possible that the connection between the structural element and the transverse tube only serves for axially securing the structural element relative to the transverse tube (without play or with play). However, it is also possible that a connection between the structural element and the transverse tube fixed against rotation is provided by any frictional and/or form-locking connection.

For one embodiment of the vehicle seat structural component the conical sleeve comprises a second opening which might be an axial or a radial opening. For providing a positive engagement or form lock in circumferential direction between the transverse tube and the structural element (and so for providing a connection fixed against a relative rotation) material of the first deformed section is deformed into the second opening.

For another proposal of the present disclosure, a front face of the first deformed section (which might be a ring-shaped front surface or a front face formed by ring segments separated by the slots) is supported on the structural element for further improving the connection between the structural element and the transverse tube. This can be explained on the basis of the following examples which are not intended to limit the present disclosure:

The curling of the first deformed section might in a semi longitudinal section be compared to a lying U. Here, the inner side leg of the U forms the aforementioned first subsection of the first deformed section and the outer side leg of the U forms the aforementioned second subsection of the first deformed section. In this case the conical sleeve is accommodated between the parallel side legs of the U. In this case the free end of the outer side leg of the U might contact the base body of the structural element or might be supported on the same. The outer side leg might then again be angled in radial inner direction so that the end of this side leg is pressed in radial inner direction against the outer surface of the conical sleeve.

Within the frame of the present disclosure, the curling might have a constant or varying radius. The circumferential angle of the curling is in the range of 220° to 310° (in particular 240° to 290°). By the choice of a circumferential angle in this range it is possible that the front face or end of the curling is pressed in radial inner direction against the outer surface of the conical sleeve or ends with a distance from the outer surface of the conical sleeve. A curling of this type might e.g. be manufactured by a given curling contour of a pressing tool used for producing the deformation.

In illustrative embodiments, the structural element might be a vehicle seat side frame element, a link, an operation element or a crank. The structural element may be included in a vehicle seat.

In illustrative embodiments, the present disclosure proposes a method for manufacturing a vehicle seat structural component for a vehicle seat, the vehicle seat structural component comprising at least some of the above mentioned features. In the method an axial section of the transverse tube which is located with a distance from an end region of the transverse tube is deformed. By this deformation the second deformed section is produced. Furthermore, the structural element and the opening and the conical sleeve of the structural element are provided. These two method steps might be executed simultaneously or parallel to each other, in the given order or in the opposite order. Subsequently, the transverse tube is inserted into the opening of the conical sleeve in a way such that the transverse tube extends with the connecting section inside from the inner surface of the conical sleeve. When inserted the second deformed section is supported in the insertion direction (and so in the second axial direction) on the structural element. In this inserted state the end region of the transverse tube protrudes from the opening of the conical sleeve. Subsequently, the protruding end region of the transverse tube is deformed in outer direction by curling. In this way the first deformed section is provided.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically shows a vehicle seat in a side view;

FIG. 2 in a three-dimensional view shows a vehicle seat structure of the vehicle seat of FIG. 1;

FIG. 3 in a three-dimensional view shows a detail of a structural element embodied as a vehicle seat side frame element of the vehicle seat structure of FIG. 2;

DETAILED DESCRIPTION

Figure 1:
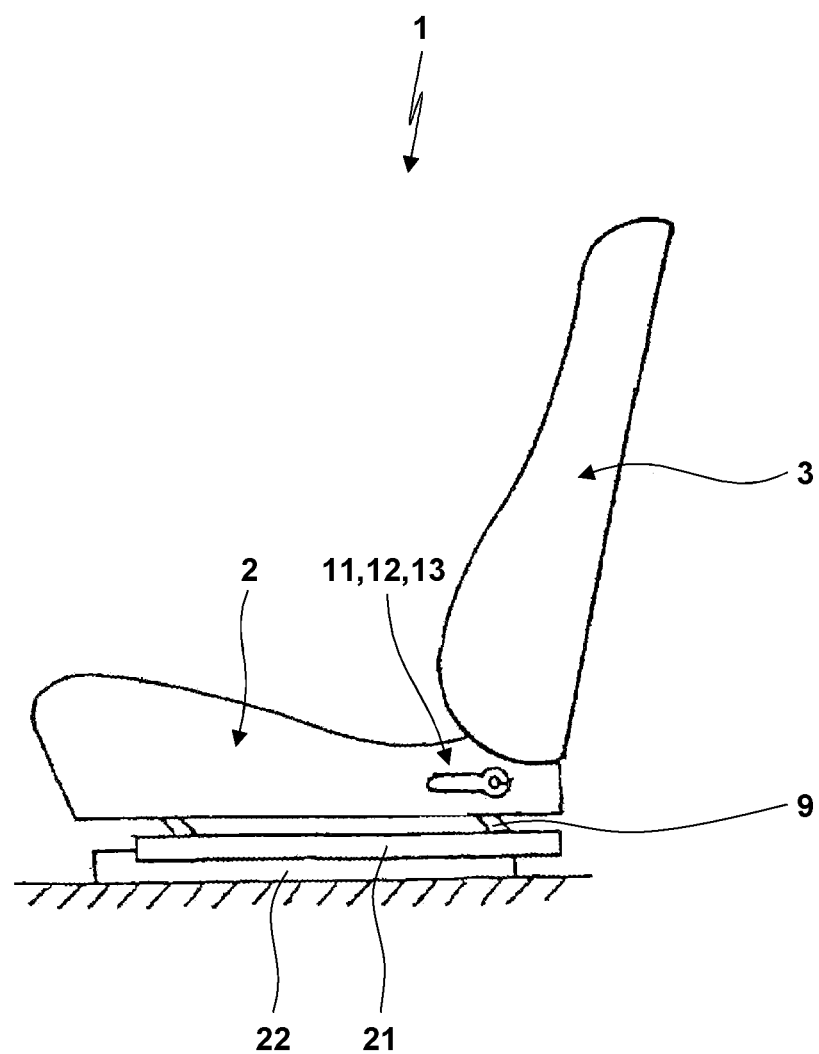

FIG. 1 in a schematic side view illustrates a vehicle seat 1 which is designated for any vehicle, in particular a passenger car or a commercial vehicle. The vehicle seat 1 comprises a seat part 2 and a backrest 3 held in a defined and variable position relative to the seat part 2. It is possible to adjust the inclination angle of the backrest 3 relative to the seat part 2 by an inclination adjusting device not shown here.

Figure 2:
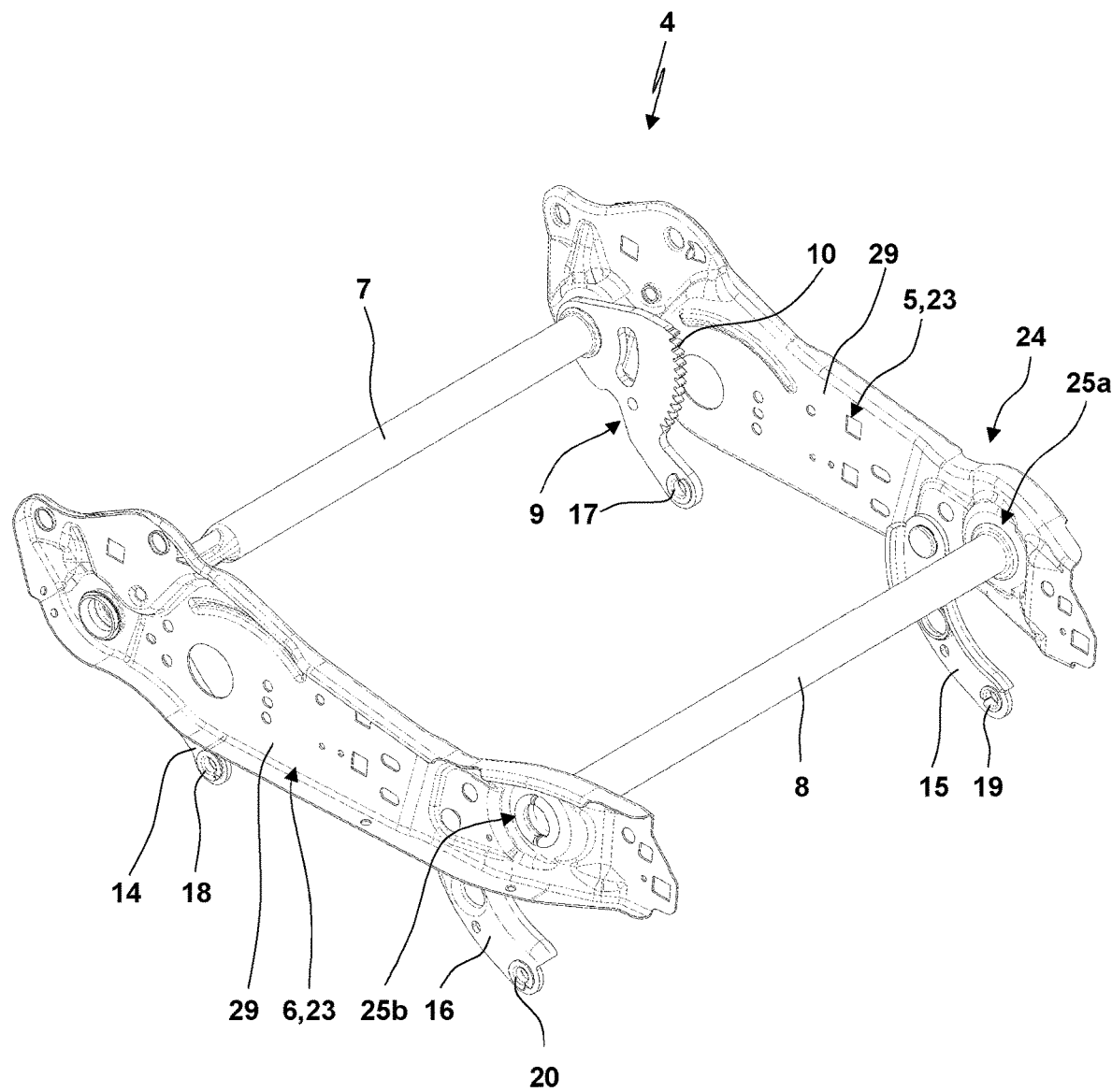

The seat part 2 comprises a frame-like vehicle seat structure 4 being illustrated in FIG. 2. Components of the seat part 2 such as a seat cushion, aggregates (such as a heating unit and/or a ventilating unit), actuating motors and the backrest 3 are supported at the vehicle seat structure 4. The vehicle seat structure 4 includes vehicle seat side frame elements 5, 6 being arranged to be parallel with respect to one another and to extend in the longitudinal direction of the vehicle. The side frame elements 5, 6 are interconnected by transverse tubes 7, 8 being arranged to be parallel to one another and to extend in the transverse direction of the vehicle. Consequently, in a top view, the vehicle seat structure 4 has a rectangular shape. As it is to be seen in FIG. 2, the vehicle seat side frame elements 5, 6 protrude beyond the transverse tubes 7, 8 in the longitudinal direction of the vehicle.

The rear transverse tube 7 is rotatingly supported in the vehicle seat side frame elements 5, 6. A height adjustment rocker 9 is non-rotatingly connected to the rear transverse tube 7. The height adjustment rocker 9 forms some sort of a link or guide (in the following "link"). The height adjustment rocker 9 includes external teeth 10. The external teeth 10 of the height adjustment rocker 9 corporate with the height adjustment unit 11 in the vehicle seat 1. The height adjustment device 11 includes a drive element 12 which is embodied as a manually actuated operation element 13 for the shown embodiment (in particular an operating lever). However, it is also possible that the drive element 12 is embodied as an electric drive being manually actuated by a switch, slide and the like. A drive torque is created by the drive element 12 and it is applied onto the external teeth 10 of the height adjustment rocker 9 resulting in a pivoting of the height adjustment rocker 9 and of the rear transverse tube 7. At a position adjacent to the other vehicle seat side frame element 6, another rocker or link 14 is non-rotatingly connected to the rear transverse tube 7.

The front transverse tube 8 is non-rotatingly connected to the vehicle seat side frame elements 5, 6. Adjacent to the connection of the front transverse tube 8 to the vehicle seat side frame elements 5, 6 links 15, 16 are linked to the vehicle seat side frame elements 5, 6 to be rotatable about a transverse axis.

The free end portions of the height adjustment rocker 9 as well as the links 14, 15 each include varying portions 17, 18, 19, 20. In the region of the varying portions 17, 18, 19, 20 the height adjustment rocker 9 and the links 14, 15, 16 are pivotably supported at parallel longitudinal rails 21 being arranged on both sides of the vehicle seat 1 and extending in the longitudinal direction of the vehicle. The longitudinal rails 21 can slide with respect to the bottom rails 22 in the longitudinal direction of the vehicle (when actuating a known adjusting mechanism). The height adjustment rocker 9 and the links 14, 15, 15 form a parallelogram guidance. By the parallelogram guidance, when the height adjustment rocker 9 is rotated, a torque being applied onto the external teeth 10 causes a common lifting and lowering of the transverse tubes 7, 8 and so a lifting and lowering of the vehicle seat structure 4 and of the whole vehicle seat 1.

Together with the structural element 23 (which for the shown embodiment is a vehicle seat side frame element 5, 6) the transverse tube 8 forms a vehicle seat structure component 24.

In following it will be explained how a rigid and in particular non-rotating connection between the transverse tube and the structural element 23 can be provided. Here, for the shown embodiments corresponding connecting regions 25a, 25b with the two vehicle seat side frame elements 5, 6 are produced.

In the connecting region 25 the structural element 23 has a first opening 26. The first opening 26 comprises a circular cross-section. In the connecting region 25 the diameter of the circular cross section forms a press fit, transitional fit, a clearance fit or a play with the outer surface of the transverse tube 8. The transverse tube 8 extends through the first opening 26.

Figure 5:
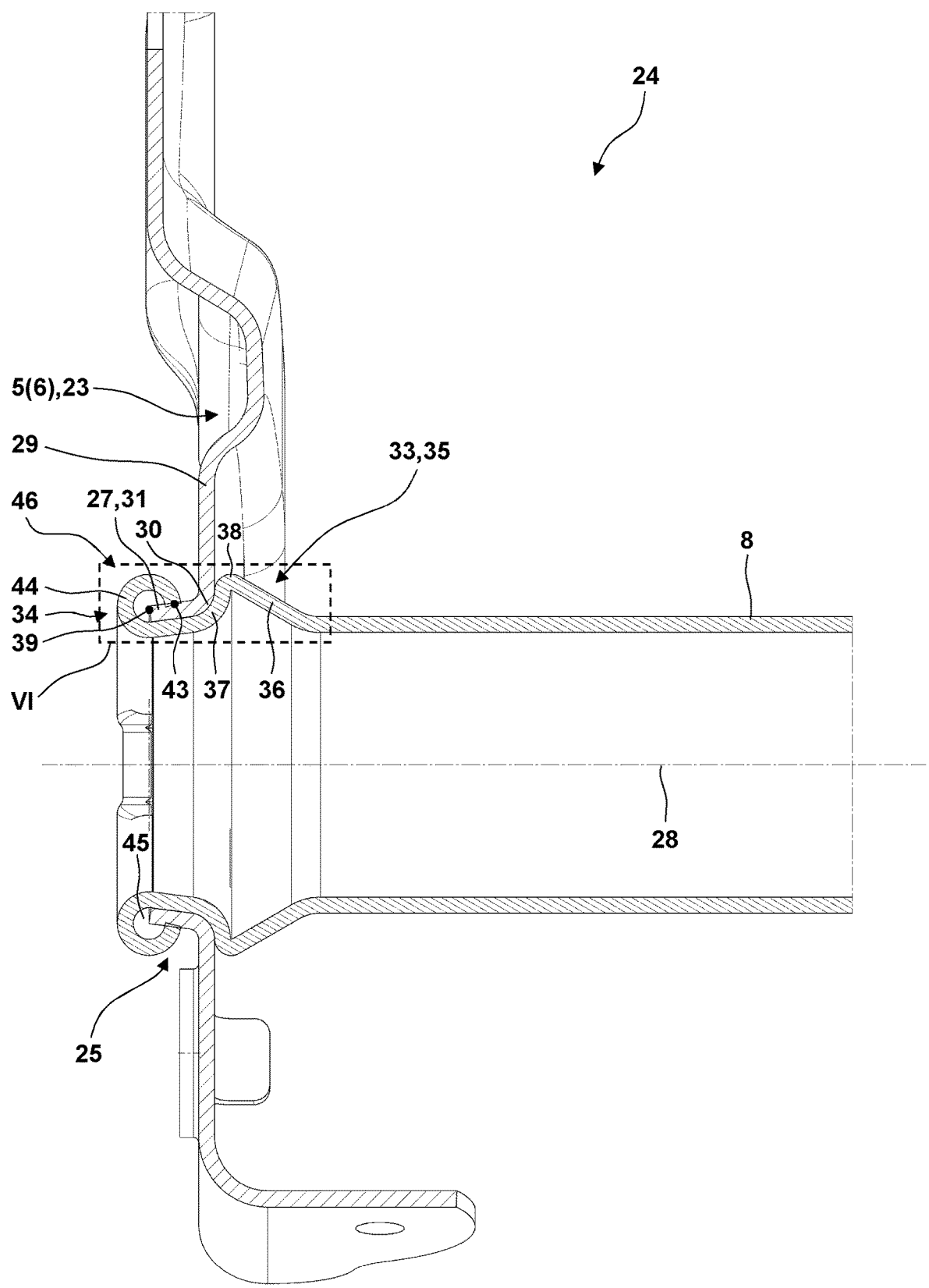
FIG. 5 shows the connecting region of a vehicle seat side frame element with a transverse tube in a semi longitudinal section through the transverse tube of the vehicle seat structure of FIG. 2.
Figure 6:
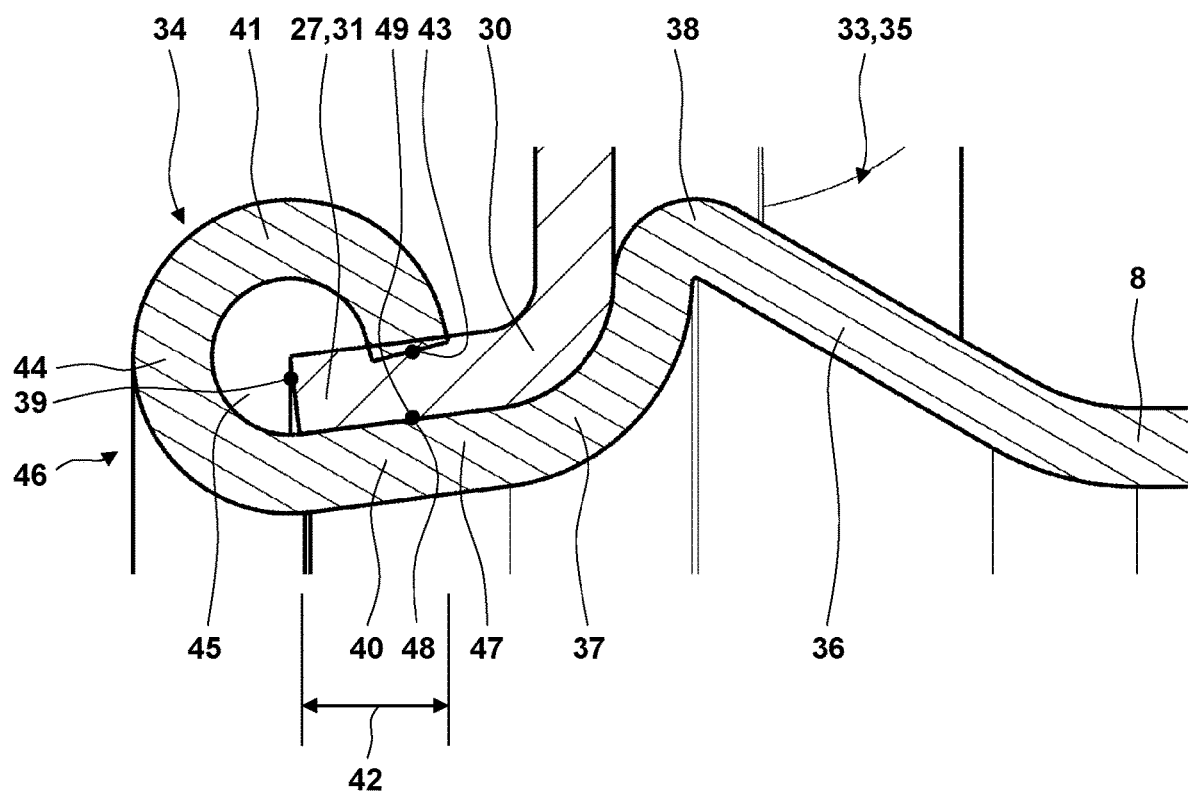
FIG. 6 shows a detail VI of the connecting region of FIG. 5.

In the region of the first opening 26 the structural element 23 comprises a protrusion 27 (which can in particular be seen in the longitudinal section through the transverse tube 8 according to FIG. 5). The axial protrusion 27 is slightly inclined relative to the longitudinal axis 28 (in particular with an inclination angle being smaller than about 30°, smaller than about 20°, smaller than about 15° or smaller than about 10°). Preferably the inclination is such that the radial distance of the protrusion 27 reduces with an increasing distance from the base body 29 of the structural element 23. In a (semi) sectional view the protrusion 27 might have any (e. g. curved or straight) contour and might e.g. in the transition region from the base body 29 include a rounded section 30.

Figure 3:
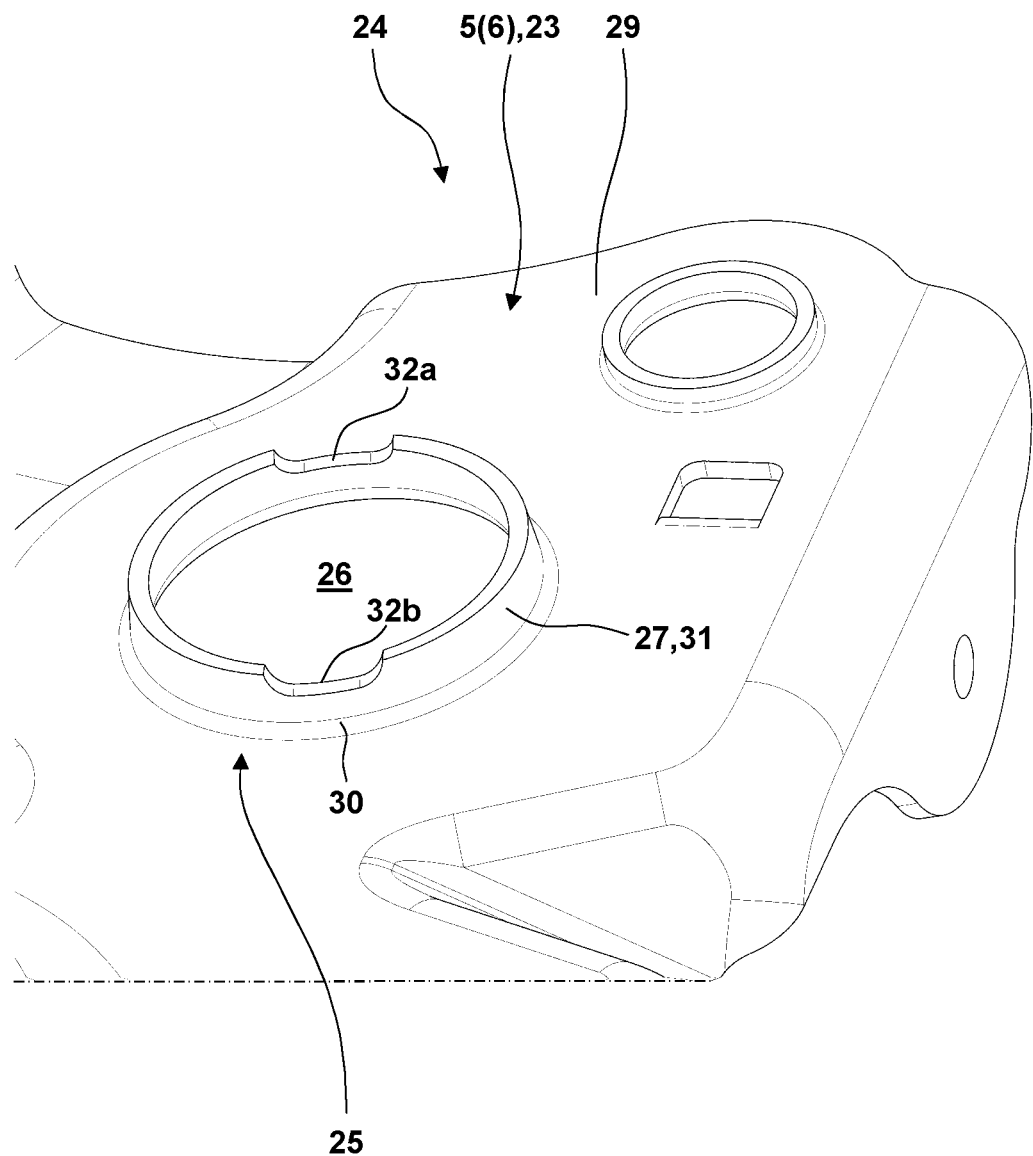
Figure 4:
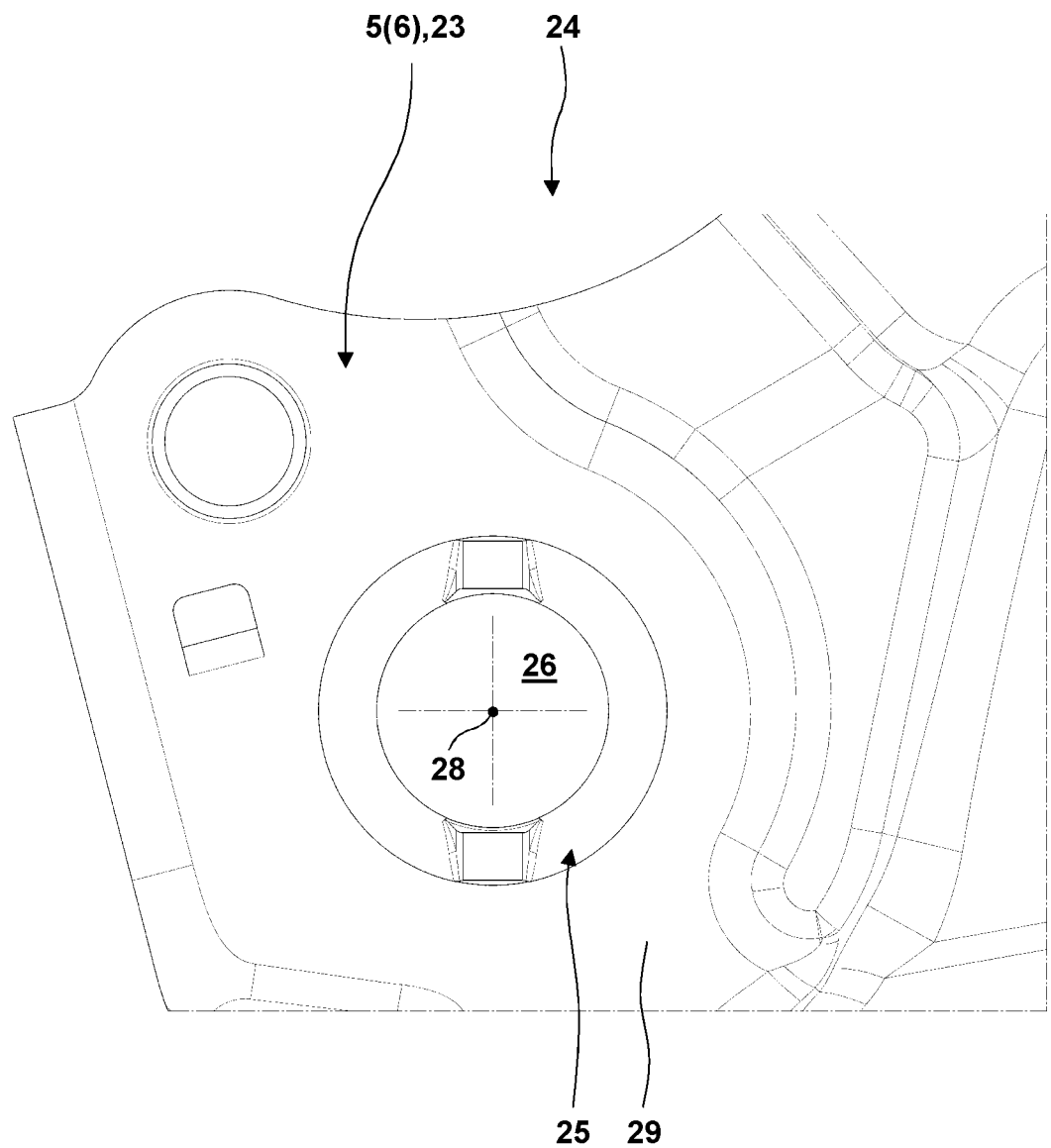
FIG. 4 shows the detail of the vehicle seat side frame element of FIG. 3 in a top view.

For the embodiment shown in FIGS. 3 to 5 the protrusion 27 is closed in circumferential direction around the longitudinal axis 28 so that the protrusion 27 forms a kind of sleeve 31. The sleeve 31 comprises an inner surface 48 and an outer surface having the shape of truncated cones. Here, the cone opens towards the base body 29 and has an opening angle corresponding to the angular regions given above for the inclination of the protrusion 27.

According to FIG. 3 the free front face 39 of the sleeve 31 is not planar. Instead, the sleeve 31 comprises second openings 32 in the free end region. For the shown embodiment to second openings 32a, 32b are arranged on opposite sides along the diameter. However, any different number of second openings 32 can be provided which might be evenly or non-evenly distributed in circumferential direction. For the shown embodiment the second openings 32 comprise a contour which are U-shaped in a developed view of the outer surface of the sleeve 31.

In the connecting region 25 the sleeve 31 is captively arranged between a first deformed section 33 and a second deformed section 34 of the transverse tube 8. Here, the second deformed section 33 is arranged on the inner side of the structural element 23 whereas the curled first deformed section 34 is arranged on the outside of the structural element 23 and formed by the end region of the transverse tube 8.

The deformation of the second deformed section 33 leads to an increase of the diameter of the transverse tube 8 such that the second deformed section 33 actually contacts the base body 29 and/or the rounded section 30 of the sleeve 31 on the inner side of the first opening 26. The second deformed section 33 is e.g. formed by widening, a swelling or built-up comprising two swelling legs 36, 37 which are connected by a folding 38 or a continuous sharp bend or bending edge to each other. For the shown embodiment the inner swelling leg 36 has a conical shape, the inclination angle of the inner swelling leg 36 in the longitudinal section of FIG. 5 e.g. being in the range of about 15° to about 50° or about 20° to about 40°. The swelling leg 37 facing towards the base body 29 of the structural element 23 is rounded to a curved shape. The swelling leg 37 follows the contour of the structural element 23 in the neighborhood of the first opening 26, here follows the rounded section 30 of the sleeve 31. Due to the contour of the swelling leg 37 a large contact area between the deformed section 33 and the structural element 23 is provided which leads to small axial contact pressures and in some cases also a support of a torsional moment in the connecting region 25.

In the region of the first deformed section 34 the transverse tube extends around the free outer end region of the sleeve 31 and around the front face 39 of the sleeve 31. Accordingly, the sleeve 31 is captively arranged in radial direction between an inner subsection 40 of the transverse tube 8 and an outer subsection 41 forming the end region of the transverse tube 8. The inner subsection 40, the sleeve 31 and the outer subsection 41 have an overlap 42 in a semi longitudinal section wherein these are arranged in the mentioned order radially one above another in a sandwiched way (with or without radial plays). The first deformed section 34 has a curling such that a front face 43 of the transverse tube 8 and of the first deformed section 34 contacts the structural element 23 and the outer surface of the sleeve 31 or is arranged with a play to the structural element 23 and the outer surface of the sleeve 31. It is possible that the front face 43 has a surface normal having an orientation approximately parallel to the longitudinal axis 28. In this case the front face 43 might contact the base body of the structural element 23. For the embodiment shown in FIGS. 3 to 5 the front face 43 comprises a surface normal which has an orientation or at least a component in radial inner direction towards the longitudinal axis 28. For the shown embodiment the front face 43 contacts the outer surface of the sleeve 31 or the front face 43 is pressed against the outer surface of the sleeve 31.

In the region of the first deformed section 34 the inner first subsection 40 is connected by another subsection or connecting portion 44 to the outer second subsection 41. In the region of the connecting portion 44 the transverse tube 8 and the first deformed section 34 are passed in radial direction along the front surface 39 of the sleeve 31 (with a contact to the front face 39 or with an axial play 45 as shown in FIG. 5).

For the shown embodiment the first deformed section 34 is embodied as a curling 46. Without this necessarily being the case the curling 46 has a constant curling radius which can be defined by a suitable forming or pressing tool when producing the first deformed section 34. The transverse tube 8 slides along the forming and pressing tool during the plastic deformation for producing the curling of the first deformed section 34.

In a semi longitudinal section the curling 46 of the first deformed section 34 is curved in one single direction without any turning point where for a constant radius of the curling 46 the curvature is constant. However, also a varying radius with a varying curvature can be used.

The deformed sections 33, 34 are connected to each other by a connecting section 47. An outer connecting section surface 49 of the connecting section 47 contacts the inner surface 48 of the sleeve 31 with a contact force or clamping force. It is possible that during the manufacturing of the connecting region 25 the connecting section 47 is widened so that there is a support of the connecting section 47 at the sleeve 31 with a large supporting area. For the shown embodiment, due to the shape of the inner surface 48 of the sleeve 31 corresponding to the shape of a truncated cone the connecting section 47 has a corresponding inclination angle.

Without the measures described in the following in the connecting portion 25, the transverse tube 8 would be fixed in axial direction to the structural element 23 due to the fact that the structural element 23 is arranged captively in axial direction between the sections 33, 34 in the region of the sleeve 31. A support of a bending moment about an axis transverse to the longitudinal axis 28 is provided by the large contact area of the outer connecting section surface 49 of the connecting section 47 and the inner surface 48 of the sleeve 31, the contact of the front face 39 with the connecting portion 44, the support of the second deformed section 33 on the base body 29 and/or the contact of the front face 39 with the base body 29 or the outer surface of the sleeve 31. Instead, a securing against rotation due to a torsional moment being effective around the longitudinal axis would only be provided by friction due to the contact surfaces listed above.

Preferably, according to the present disclosure there is additionally a form-locking or positively-engaging support of a torsional moment of this type:

For this purpose in the region of the second openings 32a, 32b the first deformed section 34 is also deformed in a direction parallel to the longitudinal axis 28 so that material of the second deformed section 34 (here of the connecting portion 44) is deformed plastically in axial direction into the second openings 32a, 32b. A support of the torsional moment is provided by the contact of the material of the connecting portion 44 arranged in the second openings 32a, 32b with the side legs of the U of the second openings 32a, 32b so that the torsional moment is supported in a reliable way by a form-locking positive engagement.

It is possible that (differing from the shown embodiment) the sleeve 31 is not closed in circumferential direction but slotted so that corresponding to the number of slots a plurality of protrusions 27 is provided which only extend over a part of the circumference and which form a kind of arms. In this case the slots might form the second openings 32.

For an alternative or cumulative embodiment it is possible that the first deformed section 34 is not closed in circumferential direction. Accordingly, it is, for example, possible (in particular dependent on the stiffness requirements and the options for the deformation of the material of the transverse tube 8) that also the transverse tube 8 comprises slots in the region of the first deformed section 34 which separate circumferential parts of the end region of the transverse tube 8 from each other. The circumferential parts are then deformed correspondingly, in particular by the generation of curlings 46.

It is also possible that circumferential parts are used for providing the overlap 32 whereas other circumferential parts separated by slots are used for the entry into the second openings 32a, 32b so that these serve for a securing against rotation.

Within the frame of the present disclosure, the transverse tube might also have any non-circular geometry and/or might have any curved longitudinal axis. Additional to the fixation to a structural element the transverse tube 8 might also serve for other purposes, e.g. for the provision of a bearing surface and the like.

Within the frame of the present disclosure, a deformation of the first deformed section 34 and/or the second deformed section 33 is preferably a plastic deformation of the transverse tube 8 in radial outer direction. This deformation might be rotationally symmetric or might have a semi longitudinal section varying in circumferential direction or might only be provided in a part of the circumference. It is possible that the free end region of the transverse tube 8 is deformed in axial direction for providing the sandwich-like overlap and/or the front face of the transverse tube 8 contacts the base body or the protrusion of the structural element. The deformation of the first deformed section 34 and/or the second deformed section 33 might be a bulged deformation, a bead and/or a folding and might have any semi longitudinal section.

In the present disclosure in some cases constructional elements being identical or similar with respect to its function and/or geometry are denoted with the same reference numeral where in this case these constructional elements are in some cases differentiated from each other by the additional letter a, b, . . . . Reference is made to these constructional elements also without the additional letter a, b, . . . . In this case the related disclosure applies for single or all of these constructional elements.

The present disclosure relates to a vehicle seat structural component being used in a vehicle seat. The vehicle seat structural component includes a structural element and a transverse tube being interconnected. For example, the vehicle seat structural component may be a part of a vehicle seat frame or a vehicle seat substructure. It is possible that the structural element is a link which, when being pivoted, induces a height adjustment of the vehicle seat. Another non-limiting example of the structural element is an operation element such as an operating lever which, when being actuated by an actuator or by the operator, induces a rotation of the transverse tube. In this way, it is possible to adjust the vehicle seat. The structural element may also be designed as a vehicle seat side frame element.

Furthermore, the present disclosure relates to a vehicle seat and a method for manufacturing a vehicle seat structural component.

A comparative height adjustment unit includes a rear transverse tube the end portion of which is rotatably supported in supports of parallel vehicle seat side frame elements. Adjacent to the supports in the vehicle seat side frame elements, structural elements being designed as links or guides (in the following "links") are located at the transverse tube. The links include bores through which the transverse tube extends. In the free end portions, the supports are rotatably supported in parallel longitudinal bars which are slidable in a horizontal direction. Pivoting of the links can be caused by a height adjustment pump and a sprocket being driven thereby. This results in the transverse tube being lifted with respect to the longitudinal bar and thus the vehicle seat side frame elements and the vehicle seat being lifted. This document proposes to form two continuous beads in the transverse tube, the guides being axially captivated and tensioned between the beads. During manufacture of the outer beads, the material of the transverse tube is also widened in a radial outer direction in the inside of the bore of the link through which the transverse tube extends. In this way, one attains a frictional non-rotatable connection between the transverse tube and the guide.

A comparative vehicle seat including a comparative structural component being designed as a link. The link is non-rotatably connected to a front transverse tube by the transverse tube being deformed to have an unround cross section in the connection region. The link having a corresponding unround recess is pushed on this unround cross section. As seen in the pushing direction, the link contacts a shoulder of the transverse tube, the shoulder being formed in a transition region of the undeformed annular cross section of the transverse tube and the unround deformed axial section. The unround end portion protruding from the link is then elastic-plastically deformed outwardly. In this way, the link is also secured axially in a direction opposite to the pushing direction. The unround cross section of the transverse tube as well as of the recess of the link may be designed as a flattened portion or as an impression or to have a polygonal cross section. By these shapes, the orientation of the transverse tube with respect to the guide is predetermined. For a different embodiment, it is proposed to arrange a continuous bead-like element in the transition region. This element forms the shoulder of the transverse tube at which the bead is supported in the pushing direction. It is also proposed in this document that—in addition to the fixation of a bead as it has been described above—a bearing acting between the transverse tube and a vehicle seat side frame portion is formed at the link. This is realized by the vehicle seat side frame element including a bearing bore in which a cylindrical surface shelf of the transverse tube is rotatably arranged. The vehicle seat side frame element is axially captivated between the shaped element forming the support for the link and another deformed element.

Fixation of a comparative structural element being designed as a link at a front transverse tube of a vehicle seat. The link includes a conical insertion inclination having notches being distributed about the circumference. The inner radius of the insertion conus is smaller than the outer radius of the transverse tube. When the transverse tube is pressed into the insertion conus of the link and through it, this results in elastic-plastic deformation of the end portion of the transverse tube. During this deformation, material of the transverse tube remains in the distributed notches. In this way, a non-rotatable connection of the transverse tube and the link is realized. The end portion protruding from the link is then expanded in a radial direction. Accordingly, exiting of the transverse tube from the link against the pushing direction is stopped.

A method for making a comparative non-rotatable connection of a metal tube and a comparative link made of sheet metal. A shaped element is produced at the tube spaced apart from the end portion. The link including a recess is then pushed onto the end of the tube until it contacts the shaped element. At the outer side, another shaped element is produced such that the link is captively arranged between the two shaped elements. The recess of the link is designed to be unround and it includes radial recesses being spaced apart the circumference. For realizing a non-rotatable connection, the shaped element of the tube is axially deformed in the region of the recesses such that the material of the shaped element of the tube enters into the recesses of the link in an axial direction. In this way, a form fit ensuring the non-rotatable connection is realized.

A comparative link being captively arranged in an axial direction between two shaped elements of a transverse tube. The sheet metal includes an unround recess having radial openings. Form fit in a circumferential direction is not realized by axially deforming the shaped elements into the openings. Instead, the transverse tube is radially deformed towards the outside in the interior of the openings and it is deformed into the openings in a radial direction in this way.

A comparative connection of a tube to a U-shaped metal sheet arranged transverse to the longitudinal axis of the tube by a coupling tube. The U-shaped metal sheet comprises two axially aligned bores into which the coupling tube is inserted with a close fit. The tube and the coupling tube have the same diameters. In the region of the front face the tube comprises a conical inclined surface for easing insertion. Here the angle of the conical surface is 10°. The coupling tube comprises a corresponding conical inner surface. When driving the tube into the coupling tube (the tube being accommodated in a die and the coupling tube and the u-shaped metal sheet being supported by a holder) the tube and the coupling tube are plastically deformed. Deformations in outer direction of the tube and the coupling tube are created, the deformations being located in driving direction in front of the legs of the U-shaped metal sheet. These deformations provide a form lock between the tube and the coupling tube and provide a form-locking securing of the coupling tube at the U-shaped metal sheet. The tube is pressed into the coupling tube to an extent such that an end region exits from the U-shaped metal sheet in pushing direction. By a circumferential groove of the holding device the end region is curled in outer direction by an angle of 180° so that the front face of the end region contacts the adjacent side leg of the U-shaped metal sheet.

A sealed connection of the ends of heat exchanger tubes to a head plate of a reservoir of the heat exchanger relates to a technological field differing from that of the present disclosure. The heat exchanger tubes comprise ribs or fins for increasing the surface area available for an exchange of heat. The heat exchanger tubes and the head plate are manufactured from brass. The heat exchanger tubes have a rectangular, box-like cross-section. For providing the connection a rectangular opening is cut out of the head plate. Here, (similar to a burr) a slightly angled flange is formed in the region of the opening. With a surface area an elastomeric sealing is attached to the rear side of the head plate. The sealing forms sleeves having rectangular cross-sections. These sleeves each extends through the openings and flanges of the head plate for the heat exchanger tubes up to the front side. The heat exchanger tubes are each passed through the associated opening and the flange of the head plate with the elastomeric sealing arranged therein so that the sealing is arranged captively between the flange and the outer surface of the heat exchanger tube.

Alternatively, the elastomeric sealing is applied on the outer surface of the heat exchanger tube. The end of the heat exchanger tube protruding on the front side from the sealing and the flange is slotted at the corners of the rectangular cross-section. The longer sides of the rectangular end are then bent back so that the longer sides at a location on the radial outside pass a part of the flanges and the front faces contact the outer surface of the flange or the front faces are arranged in close neighborhood to the outer surfaces of the flange. Instead, the end regions of the shorter sides of the rectangular cross-section are cut away so that these are arranged flush with the front faces of the bent sections of the longer sides of the rectangular cross-section. It is intended to stiffen the end region by the bending the longer sides of the rectangular cross-section of the heat exchanger tube back. The stiffening of the end region aims for at least reducing a deflection of the end region due to a compression of the sealing between the heat exchanger tube and the head plane.

Manufacturing of a ladder construction of metal with the provision of a connection between a metal rail and a hollow metal rung relates to a technological field differing from that of the present disclosure. In a first step an outer deformation of the rung is produced at a location having a distance from the end region. The rail is equipped with an accommodation for the rung. The metal sheet forming the rail is equipped with radial slots in the region of the accommodation. Tongue-shaped material regions between the slots are bent back for forming a slotted accommodating sleeve. The diameter of the accommodating sleeve is slightly smaller than the diameter of the rung. The longitudinal extension of the accommodating sleeve is smaller than the end region of the rung in front of the deformed region. The end region of the rung is then pressed into the accommodating sleeve until the deformed region actually contacts the rail. An end region of the rung protruding from the accommodating sleeve is bent to a curved shape until the end region of the rung and the end region of the accommodating sleeve are commonly curled so that these end regions engage each other in a hook-like fashion.

A method for upsetting and calking a hollow stay bolt relates to a technological field differing from that of the present disclosure. In the disclosed method a die actuated by a pneumatic, electric or hydraulic hammer deforms a hollow cylindrical end region of the stay bolt which comprises an outer thread and which is screwed to a plate in a way such that the stay bolt forms a thickening pressed against the plate.

Further features may be taken from the drawings, in particular from the illustrated designs and the dimensions of a plurality of components with respect to one another as well as from their relative arrangement and their operative connection. The combination of features of different embodiments of the present disclosure or of features of different claims independent of the chosen references of the claims is also possible. This also relates to features which are illustrated in separate drawings, or which are mentioned when describing them. These features may also be combined with features of different claims. Furthermore, it is possible that further embodiments of the present disclosure do not have the features mentioned in the claims.

The invention claimed is:
1. A vehicle seat structural component for a vehicle seat, comprising:
  a structural element, the structural element comprising a conical sleeve having an inner surface having a shape of a truncated cone, the conical sleeve having a front surface and the structural element comprising an opening limited by the inner surface of the conical sleeve;
  a transverse tube, the transverse tube comprising
  a first deformed section being deformed in radial outer direction, the first deformed section comprising a curling, the circumferential angle of the curling being in a range of 220° to 310°
  a second deformed section being deformed in radial outer direction and
  a connecting section connecting the first deformed section and the second deformed section, the connecting section comprising an outer connecting section surface, the outer connecting section surface being inclined corresponding to an inclination of the inner surface of the conical sleeve, the outer connecting section surface contacting the inner surface of the conical sleeve;
  the connecting section of the transverse tube extending through the opening of the structural element and through the conical sleeve,
  the first deformed section being arranged on a first axial side of the conical sleeve and the second deformed section being arranged on a second axial side of the conical sleeve so that the structural element is secured in a first axial direction by the first deformed section and secured in a second axial direction by the second deformed section;

the first deformed section extending with a first subsection within the inner surface of the conical sleeve, in front of the front surface of the conical sleeve and with a second subsection outside from the outer surface of the conical sleeve so that the conical sleeve is arranged captively in radial direction or radially sandwiched between the first subsection and the second subsection of the first deformed section.

2. The vehicle seat structural component of claim 1, wherein the conical sleeve is a deformed section of a base body of the structural element.

3. The vehicle seat structural component of claim 1, wherein the conical sleeve comprises a second opening and the first deformed section is deformed into the second opening resulting in a positive engagement between the first deformed section and the structural element in circumferential direction.

4. The vehicle seat structural component of claim 1, wherein a front face of the first deformed section is supported on the structural element.

5. The vehicle seat structural component of claim 1, wherein in a semi longitudinal section the first deformed section is only curved in one single direction without any turning point.

6. The vehicle seat structural component of claim 1, wherein the structural element is a vehicle seat side frame element, a link, an operation element or a crank.

7. A vehicle seat comprising the vehicle seat structural component of claim 1.

8. A method for manufacturing a vehicle seat structural component for a vehicle seat, the vehicle seat structural component comprising:

a structural element, the structural element comprising a conical sleeve having an inner surface having a shape of a truncated cone, the conical sleeve having a front surface and the structural element comprising an opening limited by the inner surface of the conical sleeve;

a transverse tube, the transverse tube comprising a first deformed section being deformed in radial outer direction, the first deformed section comprising a curling, the circumferential angle of the curling being in a range of 220° to 310° a second deformed section being deformed in radial outer direction and a connecting section connecting the first deformed section and the second deformed section, the connecting section comprising an outer connecting section surface, the outer connecting section surface being inclined corresponding to an inclination of the inner surface of the conical sleeve, the outer connecting section surface contacting the inner surface of the conical sleeve;

the connecting section of the transverse tube extending through the opening of the structural element and through the conical sleeve, the first deformed section being arranged on a first axial side of the conical sleeve and the second deformed section being arranged on a second axial side of the conical sleeve so that the structural element is secured in a first axial direction by the first deformed section and secured in a second axial direction by the second deformed section;

the first deformed section extending with a first subsection within the inner surface of the conical sleeve, in front of the front surface of the conical sleeve and with a second subsection outside from the outer surface of the conical sleeve so that the conical sleeve is arranged captively in radial direction or radially sandwiched between the first subsection and the second subsection of the first deformed section;

the method comprising the following method steps:

deforming an axial section of the transverse tube for producing the second deformed section, the axial section being located with a distance from an end region of the transverse tube;

providing of the opening and the conical sleeve in the structural element;

inserting the transverse tube with an insertion direction into the opening of the conical sleeve in a way such that the connecting section of the transverse tube extends inside from the inner surface of the conical sleeve and the second deformed section is supported in the insertion direction and in the second axial direction on the structural element and the end region of the transverse tube protrudes from the opening of the conical sleeve;

deforming the protruding end region of the transverse tube in outer direction by curling for providing the first deformed section.

* * * * *